United States Patent [19]

Margnelli

[11] Patent Number: 5,031,396
[45] Date of Patent: Jul. 16, 1991

[54] PREMOUNTING RETAINER FOR A GAS TURBINE ENGINE

[75] Inventor: Norman G. Margnelli, Berlin, Conn.

[73] Assignee: United Technologies Corporation, Hartford, Conn.

[21] Appl. No.: 444,177

[22] Filed: Dec. 1, 1989

[51] Int. Cl.$^5$ ............................................. F02C 7/32
[52] U.S. Cl. ................................. 60/39.31; 60/39.32; 248/916
[58] Field of Search .......................... 60/39.31, 39.32; 248/544, 916, 224.3, 224.4, 224.1

[56] References Cited

U.S. PATENT DOCUMENTS

| | | | |
|---|---|---|---|
| 2,339,181 | 1/1944 | Martin | 248/16 |
| 2,750,142 | 6/1956 | McKee | 248/224.1 |
| 3,228,037 | 1/1966 | Winkler | 248/224.3 |
| 3,269,118 | 8/1966 | Benedict et al. | 60/39.31 |
| 3,355,131 | 11/1967 | Fordeck et al. | 248/544 |
| 3,468,509 | 9/1969 | Foltz | 248/316 |
| 3,482,808 | 12/1969 | Rofe et al. | 248/544 |
| 3,835,623 | 9/1974 | Kline | 248/224.1 |
| 4,032,204 | 6/1977 | Nation | 312/7 R |
| 4,106,617 | 8/1978 | Boone | 206/233 |
| 4,176,580 | 12/1979 | Gallegos | 248/224.1 |
| 4,342,439 | 8/1982 | Bruner | 248/544 |
| 4,717,195 | 1/1988 | Okuyama et al. | 248/544 |

Primary Examiner—Louis J. Casaregola
Assistant Examiner—Timothy S. Thorpe
Attorney, Agent, or Firm—Gene D. Fleischhauer

[57] ABSTRACT

Stator structure for a gas turbine engine is disclosed which has retainers 26, 28 for engaging a heavy component, such as an electronic engine control 18. The retainers restrain the component against movement during installation. Various construction details which permit the stator structure to engage the component during assembly and yet allow for easy removal of the component are developed. In one embodiment, the stator structure includes a pair of circumferentially spaced retainers 26, 28 having channels 44 which open to each receive a mating element 46 on an engine component to support and position the component during installation.

10 Claims, 2 Drawing Sheets

PREMOUNTING RETAINER FOR A GAS TURBINE ENGINE

This invention was made under a Government contract and the Government has rights herein.

TECHNICAL FIELD

This invention relates to axial flow, gas turbine engines, and more particularly to a stator structure for mounting components from an external case of such an engine. This invention was developed in the field of aircraft gas turbine engines, and has particular application to the mounting of heavy structures on such an engine.

BACKGROUND OF THE INVENTION

One example of a gas turbine engine is a turbofan, gas turbine engine for propelling aircraft. The turbofan engine has a flowpath for working medium gases which extends axially through a compression section, a combustion section and a turbine section.

During operation, the working medium gases are pressurized in the compression section. Fuel is mixed with the pressurized working medium gases in the combustion section and burned to add energy to the gases. The hot, pressurized gases are expanded to the turbine section.

The stator structure of the gas turbine engine includes an engine case which extends axially and circumferentially about the sections of the engine to bound the working medium flowpath. The engine cases provide support for the sections of the engine and act as a pressure vessel to contain the hot pressurized gases.

An electronic engine control is typically mounted on the exterior of the engine and from one of the engine cases. The electronic engine control monitors engine operating parameters and regulates fuel flow from the fuel control to the combustion section of the engine. One example of such an electronic engine control are the electronic engine controls manufactured by the Hamilton Standard Division of Applicant's assignee. The electronic engine control contains electronic components including computer chips which are sensitive to shock, vibration, and extreme heat.

The support structure for mounting the engine control from an engine case includes isolators (shock absorbers) which reduce the transmission of shock and vibration to the engine control. The isolators also serve to space the engine control away from the engine case to facilitate cooling of the engine control and to isolate to some extent the engine control from the heat generated by the gas turbine engine.

The engine control is a relatively heavy item and is located close to the engine case to minimize the intrusion of the engine control and mounting structure into the nacelle compartment which houses the engine on the aircraft. In addition, the engine compartment contains many other components associated with the engine. The closeness of the engine control to the engine and the other components close to the engine control makes it difficult for one person to install the engine control and to even hold the engine control in position as the engine control is installed to the gas turbine engine.

Accordingly, engineers working under the direction of Applicant's assignee have sought to develop a mounting system which acts as a locating guide during assembly and then captures the engine control to provide total support to the component during assembly such that fastening means, such as securing bolts, may be installed by a single person using both hands of the installer to attach and torque the securing bolts to the engine case.

DISCLOSURE OF INVENTION

According to the present invention, the stator structure of gas turbine engine includes a pair of circumferentially spaced retainers, each having a channel opening in the upward direction to receive a mating element on an engine component to support and position the component during installation on the engine.

In accordance with one detailed embodiment, two pairs of retainers are used, the component is an electronic engine control having four isolators, and, the mating element on the engine control at each retainer is a portion of the associated isolator on the engine control.

A primary feature of the present invention is a support structure for a component of a jet engine. The support structure extends from an engine case and includes at least one pair of retainers. Each retainer has a channel extending circumferentially about the retainer and opening in the upward direction which adapts the retainer to engage the component. In one embodiment, the channel extends over an arc which is less than one-hundred and eighty (180°) degrees. Each retainer has a base which is attached to the adjacent portion of the support structure and a lip which adapts the retainer to trap the component in the channel. In one detailed embodiment, the component is an electronic engine control. The electronic engine control has a pair of shock mounts or isolators which adapt the electronic engine control to engage the retainer. In one detailed embodiment, the isolator has a spring cup and spring. The retainer is adapted by a lip to trap both the spring cup and at least one coil of the spring.

A principal advantage of the present invention is the ease and speed of assembly of a heavy engine component to the engine which results from the retainers which capture the component during installation enabling a single person to be the installer and to use both hands to install and torque fasteners, such as mounting bolts. Another advantage is the level of safety which results from supporting the heavy component against slipping or dropping during installation which could injure the installer or damage the component. Still another advantage is the ease and speed of disassembly which results from positively supporting the component with the retainers during disassembly. Still another advantage is the angle of the supported unit to the horizontal which provides an adequate level of retention forces.

The foregoing features and advantages of the present invention will become more apparent in light of the following detailed description of the best mode of carrying out the invention and in the accompanying drawings.

BEST MODE FOR CARRYING OUT THE INVENTION

Figure 1:
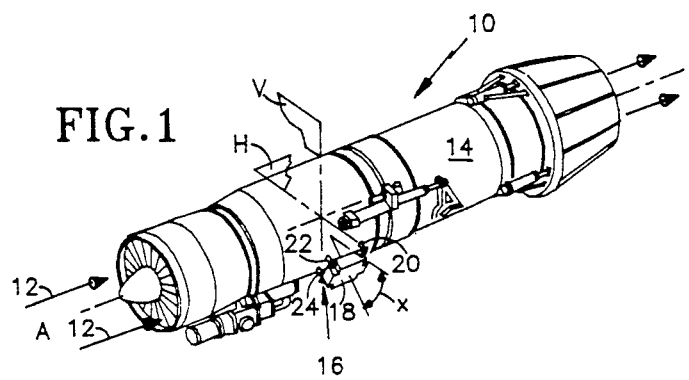
FIG. 1 is a partial perspective view of an axial flow turbofan gas turbine engine showing a horizontal reference plane H, a vertical reference plane V, and the angle y of the engine control to the horizontal reference plane.

FIG. 1 is a partial perspective view of a turbofan gas turbine engine 10 having an axially extending flowpath for working medium gases 12. The engine has an axis A which extends axially through the engine. A vertically extending reference plane V and a horizontally extending reference plane H intersect at the engine axis A.

An external case 14 extends circumferentially about the axis A. In the embodiment shown, the external case is spaced radially from the engine case which forms the pressure vessel for the engine. In other embodiments, the case might be a portion of the pressure vessel for containing the hot, pressurized gases of the engine.

Support structure 16 extends from the external case 14 of the engine to an external component, as represented by the electronic engine control 18, The support structure includes four brackets, as represented by the three brackets 20, 22, 24 which are shown. The engine control is attached to the four brackets.

Figure 2:
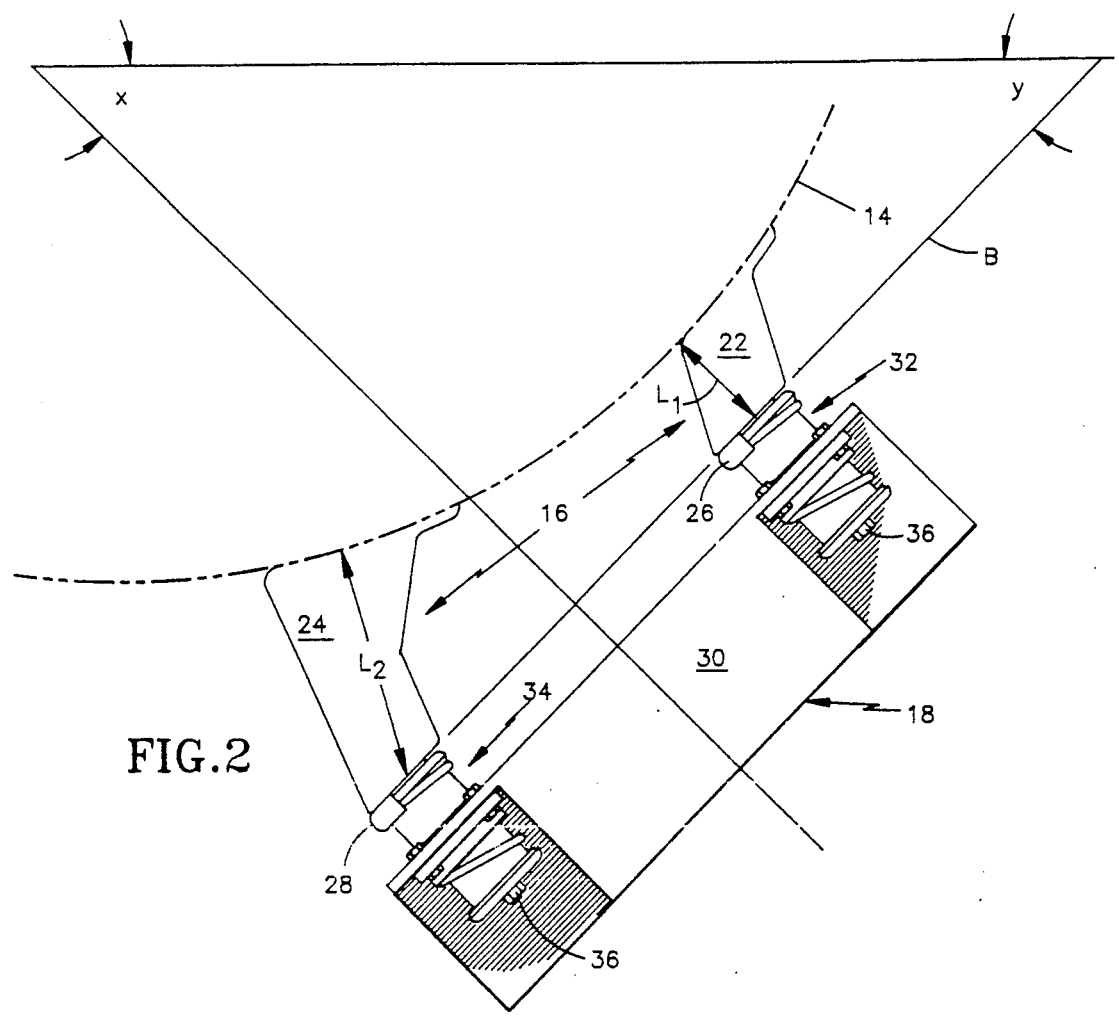
FIG. 2 is an enlarged diagrammatic view of a portion of FIG. 1 showing the engine case in phantom and showing a side elevation view of an electronic engine control and support structure for the electronic engine control.

FIG. 2 is an enlarged side elevation view of a portion of the engine shown in FIG. 1 showing the relationship of the electric engine control 18 and its support structure 16 to the engine case. The support structure for mounting the engine control includes the first bracket 22 and the second bracket 24 which is spaced circumferentially from the first bracket. The second bracket has a length $L_2$ which is approximately twice the length of the first bracket $L_1$. Each bracket has a retainer as represented by the first retainer 26 on the first bracket and the second retainer 28 on the second bracket. Each retainer is integral with the associated bracket (that is, acts as one piece by being integrally attached or formed as one piece with the bracket).

The electronic engine control has a housing 30 and four isolators as represented by the isolator 32 and the isolator 34. The isolators are means for shock mounting the engine control from the gas turbine engine. Each isolator is attached to the engine control housing and engages an associated retainer. The isolator has a bore (not shown) extending through the isolator which adapts the isolator to pass a mounting bolt. A mounting bolt 36 at each isolator threadably engages the adjacent support structure 16.

As shown in FIG. 2, the electronic engine control 18 engages each retainer 26, 28 in a plane of engagement which extends at an angle which is approximately forty-five degrees (45°) with respect to the horizontal reference plane, as shown by the angle y. In the embodiment shown, each retainer lies in the same plane B. A line perpendicular to the plane B of the retainers also intersects the horizontal plane at an angle x of approximately forty-five (45°). In the particular embodiment shown, the angle x is forty-four degrees (44°) and the angle y is forty-six degrees (46°).

Figure 3:
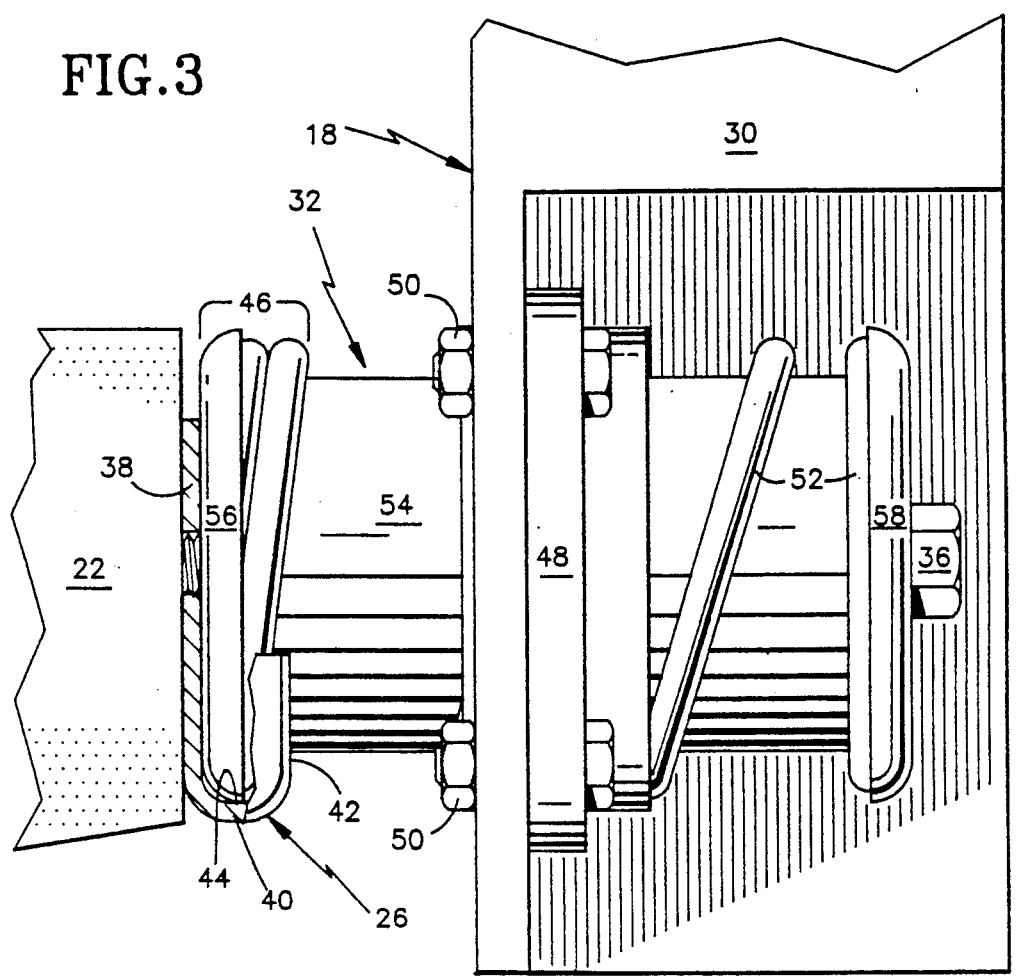
FIG. 3 is an enlarged side elevation view of an electronic engine control, a retainer for the electronic engine control, and the isolator portion of the electronic engine control which engages the retainer.

FIG. 3 is an enlarged side elevation view of a portion of the engine control housing 30, the isolator 32, and the first retainer 26. Each retainer has a base 38, a circumferentially extending first element 40 which extends in a direction generally perpendicular to the base, and a lip 42 extending from the first element and substantially parallel to the base. The base, the first element, and the lip bound a channel 44 facing in the vertical or upward direction. A mating element 46 on the isolator 32 of the electronic engine control 18 is captured by the retainer to hold the engine control against movement as the engine control is installed in the engine.

The isolator 32 has a collar 48 which is integrally joined to the engine control housing 30 by fastener means, such as the nut and bolt combinations 50. The isolator has a coil spring 52 which is attached to the collar. The isolator further includes a central spool 54 having a bore for receiving the mounting bolt. The spring is disposed about the central spool. The central coils of the spring are movable with respect to the spool. A pair of spring retainers at each isolator, as represented by the spring cup 56 and the spring cup 58, capture the spring and are attached to the spool by means not shown. The spring cup 56 and an end coil of the spring 52 form the mating element 46 on the electronic engine control. The mounting bolt 36 extends through the bore to threadably attach the isolator to the retainer 38 and the bracket 22. In other embodiments, the spring retainer might be a simple, flat spacer.

Figure 4:
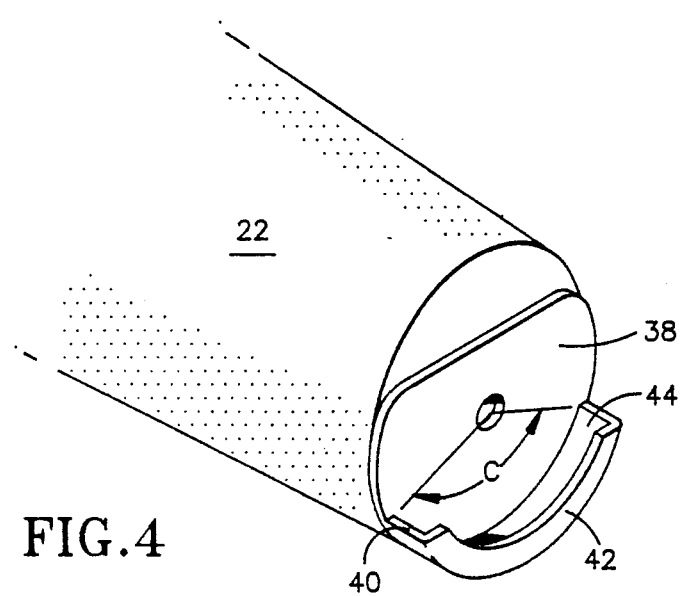
FIG. 4 is a partial perspective view of the retainer shown in FIG. 3.

FIG. 4 is a partial perspective view of the bracket and the retainer. The first element 40 bounds the bottom of the channel 44 with the base 38 and the lip extending circumferentially to bound the other sides of the channel. As shown in FIG. 4, the first element, which extends from the base, extends circumferentially about the base with an arc C of less than one-hundred and eighty degrees (180°). In the embodiment as illustrated, the arc is approximately one hundred and thirty degrees (130°).

As shown in FIG. 2, the retainers 26, 28 lie in a plane which makes an angle of approximately forty-five degrees (45°) to the horizontal plane. In other embodiments, the circumferentially spaced retainers might each lie in planes which are substantially parallel to each other and each of which has an angle of some magnitude with respect to the horizontal plane. Any angle which orients the channel in the upward or vertical direction will cause the electronic engine control to press against the first element. The forty-five degree (45°) angle is helpful. The angle minimizes the intrusion of the electronic engine control into the nacelle compartment which extends around the external case of the engine while orienting the channel such that the gravitational force on the engine control causes the engine control to press against the first element of the retainer in a circumferential direction with a force that is nearly equal to the force which causes the electronic engine control to press against the lip of the retainer. This ensures a positive capturing of the electronic engine control during installation. It might be possible to increase the angle y with respect to the horizontal axis and increase the force against the first element, but this would increase the length $L_2$ of the second bracket causing more of an intrusion into the engine compartment.

The retainer captures a portion of the spring cup and the spring of the engine isolator to positively trap the mating element 46 of the isolator. In some constructions, it might possible to eliminate the bolt 36 at one of the pair of circumferentially spaced retainers providing that the circumferentially spaced retainer is held against circumferential, radial and axial movement by the lip of the retainer. This would require the insertion of only one bolt for each pair of circumferentially spaced retainers to positively restrain the engine control against movement In this embodiment, the retainer acts as both a premounting device to capture the engine control and acts as a mounting device in the installed condition to retain the engine control against movement in the installed condition.

During installation, the spring cup and a portion of the spring of each isolator are inserted into the channel of the retainer to positively locate the electronic engine control. The circumferential arc C of the lip which is less than one-hundred and eighty degrees (180°) facilitates engagement between the mating element of the isolator and the retainer. After the mating elements of the four isolators each engage the associated retainer, an installer who is working alone may remove his or her hands from the electronic engine control and the electronic engine control will remain in place. Thereafter, the installer is free to use both hands to insert and torque the securing bolts to hold the engine control in place. In the installed condition, the bolt positions the mating element 46 such that a clearance gap exists between the coil of the spring 52 and the lip 42. This allows the spring to move more freely in comparison to embodiments in which the spring engages the lip. Should a bolt fail or through oversight not be installed, the retainer will act to positively restrain the engine control against movement until the absence of the bolt is noticed and the missing bolt supplied.

A particular advantage of this type of support structure is that the engine control is positively located during installation prior to insertion of the mounting bolts. This both facilitates assembly and increases the speed of assembly because a single installer is free to use both hands to accomplish installation. Moreover, installation can be accomplished by one person working in tight quarters. Still another advantage is the safety which results from eliminating the possibility of the engine control slipping from the hands of a single installer as the installer attempts to torque the bolts in place while trying to restrain the engine control against movement. This avoids injuries to both the installer and to the engine control which might occur if the engine control is dropped. The same advantages result during disassembly. During removal of each mounting bolt, the engine control is held in place by the retainer. After all bolts are removed, the isolators are disengaged from the retainers and the engine control is removed from the engine.

Although the invention has been shown and described with respect to detailed embodiments thereof, it should be understood by those skilled in the art that various changes in form and detail thereof may be made without departing from the spirit and scope of the claimed invention.

I claim:

1. A gas turbine engine which extends circumferentially about an axis A, the engine having external stator structure for mounting an associated component to the engine, the engine having a horizontal reference plane and a vertical reference plane which intersect at the axis A, the gas turbine engine comprising:
   at least one pair of circumferentially spaced retainers, each retainer having a channel which faces in the vertical direction, the retainer including a base bounding one side of the channel, a first element which extends from the base and bounds the bottom of the channel and a lip extending from the first element and substantially parallel to the base to bound the other side of the channel;
   an associated component having two mating elements which are each disposed in an associated channel and which adapt the engine component to engage the retainer during assembly or disassembly of the engine and,
   a pair of mounting fasteners which attach the component to the stator structure to restrain the component against axial, radial and circumferential movement under operative conditions of the engine.

2. The gas turbine engine of claim 1 which further includes a second pair of said retainers and the component has a mating element at each retainer.

3. The gas turbine engine of claim 2 wherein the pair of mounting fasteners is a pair of mounting bolts, with one bolt at one retainer of each of said pair of retainers.

4. The gas turbine engine of claim 3 wherein each retainer is engaged by a mounting bolt.

5. The gas turbine engine of claim 1 wherein the associated component has isolator means for shock mounting the component from the gas turbine engine at each of said retainers, and wherein the mating element at each retainer is a portion of said isolator means.

6. The gas turbine engine of claim 2 wherein the associated component has isolators at each of said retainer, and wherein the mating element at each retainer is a portion of said isolator.

7. The gas turbine engine of claim 3 wherein the associated component has isolators at each said retainers, and wherein the mating element at each retainer is a portion of said isolator.

8. The gas turbine engine of claim 4 wherein the associated component has isolators at each of said retainer, and wherein the mating element at each retainer is a portion of said isolator.

9. In a gas turbine engine having an axis A and having a case which extends circumferentially about the axis, the case having a vertically extending reference plane and a horizontally extending reference plane which intersect at the axis of the engine, the engine further including an electronic engine control, and support structure extending from the case to support and position the electronic engine control, the improvement which comprises:
   support structure for the electronic engine control which includes
   at least a first bracket and a second bracket spaced circumferentially from the first bracket, each bracket being integral with the case;
   a first retainer attached to the first bracket which has a channel extending circumferentially about the retainer and opening in the vertical direction, the first retainer including
      a base extending at approximately a forty-five degree angle with respect to the horizontal plane and bounding one side of the channel,
      a first element which extends from the base and circumferentially about the base with an arc of less than one-hundred and eighty degrees and bounding the bottom of the channel, and
      a lip extending from the first element and substantially parallel to the base to bound the other side of the channel;

a second retainer attached to the second bracket which has a channel extending circumferentially about the retainer and opening in the vertical direction, the second retainer including
- a base extending at approximately a forty-five degree angle with respect to the horizontal plane and bounding one side of the channel,
- a first element which extends from the base and circumferentially about the base with an arc of less than one-hundred and eighty degrees and bounding the bottom of the channel, and
- a lip extending from the first element and substantially parallel to the base to bound the other side of channel;

an electronic engine control disposed between the retainers which has a spring mounted isolator at each retainer, each spring mounted isolator having a mating element which is disposed in the channel of the retainer between the base and the lip to radially trap the mating element, the upper isolator element having a bore which adapts the isolator to receive a mounting bolt, and a mounting bolt which passes through the bore to threadably engage the retainer, the bolt urging the isolator radially against base of the retainer to secure the electronic engine control against movement;

wherein each of the mating elements is adapted to engage the retainer during assembly or disassembly with the mounting bolts removed to restrain the electronic engine control against radial movement by engaging the lip and against axial and circumferential movement by engaging the first element in response to gravitational force.

10. The gas turbine engine of claim 9 wherein each pair of retainers lies in the same plane.

* * * * *